Feb. 17, 1959 H. HAEBLER 2,874,203
SEPARATOR AND ELECTRODE ASSEMBLY FOR
STORAGE BATTERIES AND THE LIKE
Filed Oct. 2, 1956 2 Sheets-Sheet 1

INVENTOR.
Herbert Haebler
BY Michael S. Striker
Attorney

Feb. 17, 1959 H. HAEBLER 2,874,203
SEPARATOR AND ELECTRODE ASSEMBLY FOR
STORAGE BATTERIES AND THE LIKE
Filed Oct. 2, 1956 2 Sheets-Sheet 2
Fig. 4
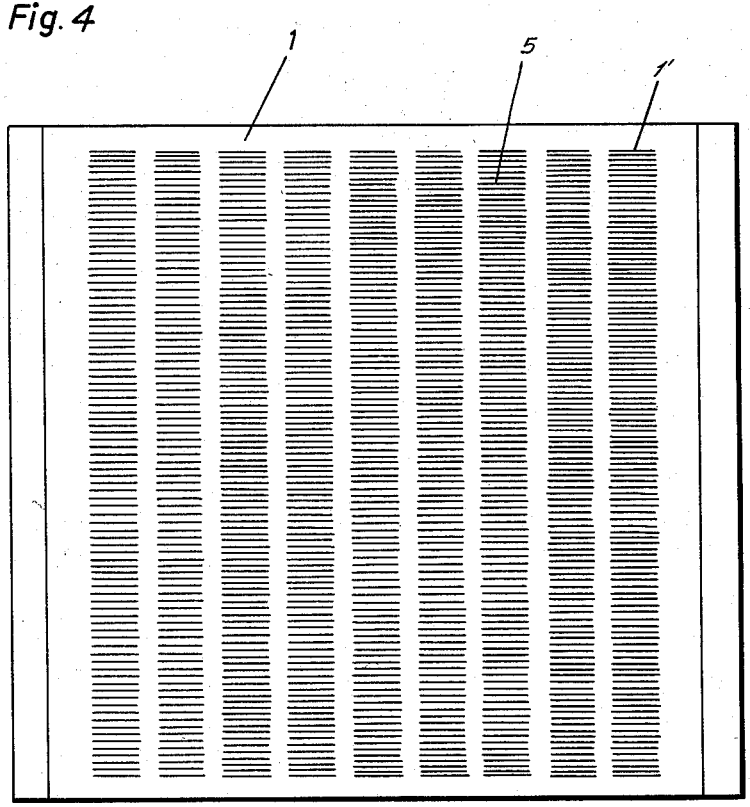
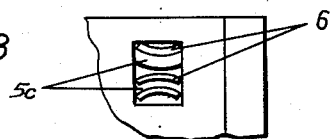
Fig. 8
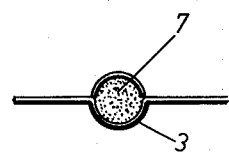
Fig. 5
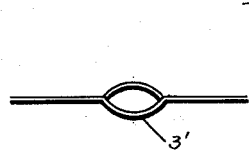
Fig. 6
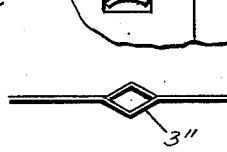
Fig. 7
Inventor.
Herbert Haebler
By Michael S. Striker
af.

United States Patent Office 2,874,203
Patented Feb. 17, 1959

2,874,203

SEPARATOR AND ELECTRODE ASSEMBLY FOR STORAGE BATTERIES AND THE LIKE

Herbert Haebler, Frankfurt am Main-Praunheim, Germany, assignor to Firma Accumulatoren-Fabrik Aktiengesellschaft, Hagen, Westphalia, Germany Application October 2, 1956, Serial No. 613,408

Claims priority, application Germany October 3, 1955

8 Claims. (Cl. 136—43)

The present invention relates to electrical apparatus such as storage batteries and the like.

More particularly, the present invention relates to an electrode assembly for a storage battery or the like and to a separator forming part of such an electrode assembly.

In electrode assemblies of the type which are used at the present time in storage batteries or the like, it is customary to locate each electrode and the active mass surrounding the same in a tube which may be porous or which may have cutouts formed therein. These latter tubes are individually formed, and the cost of the assembly is increased not only by the expense involved in the manufacture of the tubes themselves but also by the fact that each tube must be separately assembled with each electrode.

One of the objects of the present invention is to provide for an electrode assembly of the above type a plurality of tubes of the type referred to above which are interconnected with each other and which form part of a single sheet of material.

Another object of the present invention is to provide tubes of the above type which have any desired configuration, which can be very quickly and easily manufactured, which can be very easily and quickly assembled with the remainder of the electrode assembly, and which can reliably support the active masses surrounding the electrodes and which will not cause short circuits or the like to occur by portions of the active mass which are prevented from falling to the bottom of the cell by parts of the tubes themselves.

With the above objects in view, the present invention mainly consists of an electrode assembly of the above type which includes a sheet of electrically non-conductive material having a plurality of rows of band portions formed from the material of the sheet and each of which is integral at its ends with the sheet. Alternate band portions of each row extend in one direction from the plane of the sheet and the remaining band portions of each row extend in the opposite direction from the plane of the sheet, so that the alternate and remaining band portions of each row cooperate together to form an elongated tube carried by said sheet and having a plurality of slots with the band portions of each tube respectively located opposite the slots thereof. The active mass which surrounds the electrodes is located within these tubes, and each of the tubes may be filled with a porous electrically non-conductive material such as particles of rubber or the like which absorb the active mass. With this arrangement of tubes, a series of such tubes are interconnected and carried by the sheet and may be simultaneously placed on the electrodes, so that the assembly cost is greatly reduced. Furthermore, the tubes of the above type may be very quickly and inexpensively manufactured.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 4 is an illustration of a sheet according to the present invention formed with a plurality of rows of cuts therein to provide the sheets with band portions which may then be formed into a plurality of tubes;

Figs. 5–7 are respectively views taken in planes normal to the axis of each tube and showing the configuration of different band portions which are used to provide tubes of different configurations; and Fig. 8 shows a plurality of band portions as they appear from the inside of a tube and Fig. 8 shows how flaps joined to the band portions may extend from edges thereof into the interior of the tubes.

Figure 1:
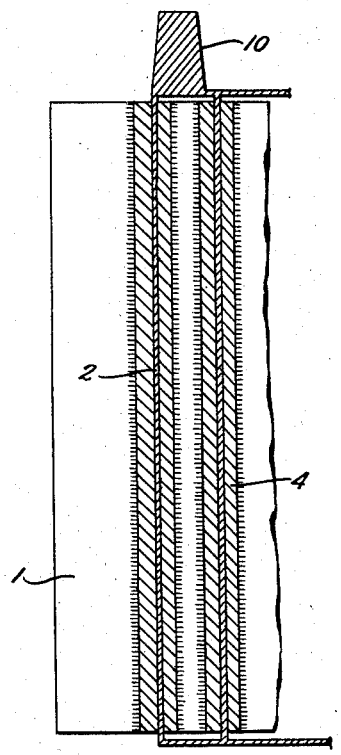
Fig. 1 is a fragmentary elevational, partly sectional view of an electrode assembly according to the present invention, the section of Fig. 1 being taken through the tubes which contain the current collector and the active masses surrounding the same.
Figure 2:
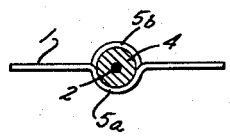
Fig. 2 is a fragmentary sectional view taken in a plane normal to an electrode in a tube according to the present invention and showing part of the sheet and tube which surrounds the active mass in which the current collector is located.
Figure 3:
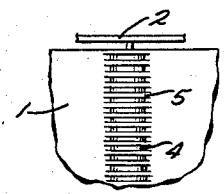
Fig. 3 is a fragmentary elevational view illustrating how one of the tubes according to the present invention appears from the exterior thereof.

Referring now to the drawings, Fig. 1 shows part of an electrode assembly according to the present invention. As may be seen from Fig. 1, a sheet 1 of electrically non-conductive material carries the tubes through which the current collectors 2 respectively extend. This sheet 1 may be made of a synthetic plastic and may be composed of materials such as polystyrene, polyethylene, or polymethylmethacrylate. The sheet 1, as may be seen from Fig. 4, is first provided with a plurality of rows of cuts 1', and these cuts define between themselves band portions 5 each of which is integral at its ends with the sheet 1. It is an extremely simple matter to form the cuts 1' continuously in an elongated sheet. The alternate band portions 5 of each of the rows of band portions shown in Fig. 4 are pressed in one direction from the plane of the sheet 1, and such alternate band portions 5 are visible in Fig. 3. The remaining band portions of each row are pressed in the opposite direction from the plane of the sheet, and Fig. 2 shows one band portion 5a extending in one direction from the plane of the sheet 1 and the next band portion 5b extending in the opposite direction from the plane of the sheet 1. Thus, each row of band portions forms an elongated tube having a plurality of slots with the band portions of each tube respectively located opposite the slots. The portion of the tube which is not visible in Fig. 3 therefore has slots respectively located opposite the band portions 5 which are visible in Fig. 3. Depending upon the nature of the material of the sheet 1, the band portions 5 may be pressed in the opposite directions either by cold or hot working of the material. It should be noted that instead of providing cuts 1' extending all the way through the material of the sheet 1, the band portions may simply be stamped and simultaneously bent from the material of the sheet 1, or instead of cuts 1' a plurality of rows of scratches may be provided so that then the portions of the sheet separated by the scratches may be very easily bent in the desired direction from the sheet while being simultaneously torn therefrom.

It is thus apparent that with the above-described process a plurality of slotted tubes are formed, and these slotted tubes are carried by the sheet 1 from the material of which the tubes are formed. The band portions 5 may extend longitudinally or transversely of the sheet from which they are formed, or they may, if desired, extend diagonally with respect to the sheet from which they are formed.

As is shown in Fig. 5, a suitable non-conductive absorbent mass 7 composed, for example, of particles of rubber is filled into the interior of the tubes. Where this mass is in the form of a paste, it can be very quickly and easily inserted into the tubes through the slots thereof.

It should furthermore be noted that the band portions 5 need not all be of the same size. They may all be of the same size, or the band portions extending to one side of the plane of the sheet 1 may be wider or longer than the band portions extending to the opposite side of the sheet 1.

In order to provide a secure support for a mass such as the mass 7 shown in Fig. 5, the band portions 5c shown in Fig. 8 may have flaps 6 joined to one or both of the edges thereof and extending into the interior of the tube so that these flaps 6 extend into the mass 7 to securely support the same. It is evident that these flaps 6 may be formed simultaneously with the bending of the band portions from the material of the sheet 1. Fig. 8 shows an arrangement where one band portion 5c has one flap 6 joined to an edge thereof while the next band portion 5c has a pair of flaps 6 respectively joined to the edges thereof, but it is possible to provide some or all of the band portions of a given tube with only one flap or with a pair of flaps 6.

A particular feature of the invention resides in the fact that a continuously moving sheet 1 may be continuously provided with cuts, scratches, or the like, and the band portions may be continuously bent in opposite directions from the plane of the sheet to form the tubes. Then it is a simple matter to cut from such a sheet a portion thereof having a number of tubes of a desired length, so that this portion can then be very quickly and easily assembled with the remainder of the electrode assembly.

Thus, referring to Fig. 1, it will be seen that the plurality of tubes can simultaneously be placed over the plurality of electrodes, so that the necessity of locating separate tubes over separate electrodes is not required. As may be seen from Fig. 1, the current collectors 2 are joined at their ends by conductors. Furthermore, a terminal 10 is shown in Fig. 1. With the arrangement shown in Fig. 1, one of the conductors which interconnects the successive current collectors 2 is first joined to these electrodes, and then the sheet 1 with the active mass 4 in the tubes thereof is placed over the current collectors, and then the free ends of the current collectors have the other conductor joined thereto. The current collectors 2 may be made of lead and the active mass 4 may be a composition of lead oxide and sulfuric acid, and an absorbent material such as the material 7 shown in Fig. 5 absorbs the active mass and holds the latter around the electrodes.

As is apparent from Figs. 2 and 5, each of the band portions designated by the numeral 3 in Fig. 5 may have an arcuate configuration and may form part of a circle. However, as is shown in Fig. 6, the band portions 3' may, if desired, be arcuate and form part of an ellipse. Fig. 7 shows an arrangement where each of the band portions 3" has a pair of substantially straight parts making a predetermined angle with each other. Thus, with the invention it is possible to provide tubes of any desired cross section.

It will be noted that with the structure of the invention the current can flow in a substantially straight line through the tubes which is a considerable advantage over known constructions where the current cannot flow in such straight lines, and furthermore any parts of the active mass which become separated from the remainder of the active mass can simply fall to the bottom of the cell. The tubes of the invention cannot form supports for such separated parts of the active mass, and thus these separated parts of the active mass cannot be maintained in the cell at places where they are likely to cause short circuits.

It will be understood that each of the elements described above, or two or more together, may also find a useful application in other types of electrode assemblies differing from the types described above.

While the invention has been illustrated and described as embodied in separators for electrode assemblies, it is not intended to be limited to the details shown, since various modifiications and structural changes may be without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An electrode assembly for a storage battery and the like, comprising a unitary sheet of electrically non-conductive material including a plurality of rows of band portions each of which is integral at its ends with said sheet, said band portions being formed from the material of said sheet and alternate band portions of each row extending in one direction from the plane of said sheet with the remaining band portions of each row extending in an opposite direction from the plane of the sheet so that the alternate and remaining band portions of each row form a tube carried by said sheet and said tube having a plurality of slots with a plurality of band portions respectively located opposite said slots; a plurality of current collectors respectively extending along the interiors of said tubes; and a plurality of active masses surrounding said current collectors, respectively, and located in said tubes, respectively; said band portions each having an arcuate configuration.

2. An electrode assembly for a storage battery and the like, comprising a unitary sheet of electrically non-conductive material including a plurality of rows of band portions each of which is integral at its ends with said sheet, said band portions being formed from the material of said sheet and alternate band portions of each row extending in one direction from the plane of said sheet with the remaining band portions of each row extending in an opposite direction from the plane of the sheet so that the alternate and remaining band portions of each row form a tube carried by said sheet and said tube having a plurality of slots with a plurality of band portions respectively located opposite said slots, a plurality of current collectors respectively extending along the interiors of said tubes; and a plurality of active masses surrounding said current collectors, respectively, and located in said tubes, respectively; said band portions each having an arcuate configuration and forming part of a circle.

3. An electrode assembly for a storage battery and the like, comprising a unitary sheet of electrically non-conductive material including a plurality of rows of band portions each of which is integral at its ends with said sheet, said band portions being formed from the material of said sheet and alternate band portions of each row extending in one direction from the plane of said sheet with the remaining band portions of each row extending in an opposite direction from the plane of the sheet so that the alternate and remaining band portions of each row form a tube carried by said sheet and said tube having a plurality of slots with a plurality of band portions respectively located opposite said slots, a plurality of current collectors respectively extending along the interiors of said tubes; and a plurality of active masses surrounding said current collectors, respectively, and located in said tubes, respectively; said band portions each having an arcuate configuration and forming part of an ellipse.

4. An electrode assembly for a storage battery and the like, comprising a unitary sheet of electrically non-conductive material including a plurality of rows of band portions each of which is integral at its ends with said sheet, said band portions being formed from the material of said sheet and alternate band portions of each row extending in one direction from the plane of said sheet with the remaining band portions of each row extending in an opposite direction from the plane of the sheet so that the alternate and remaining band portions of each row form a tube carried by said sheet and said tube having a plurality of slots with a plurality of band portions respectively located opposite said slots, a plurality of current collectors respectively extending along the interiors of said tubes; and a plurality of active masses surrounding said current collectors, respectively, and located in said tubes, respectively; each of said band portions having a pair of substantially straight parts making a predetermined angle with each other.

5. An electrode assembly for a storage battery and the like, comprising a unitary sheet of electrically non-conductive material including a plurality of rows of band portions each of which is integral at its ends with said sheet, said band portions being formed from the material of said sheet and alternate band portions of each row extending in one direction from the plane of said sheet with the remaining band portions of each row extending in an opposite direction from the plane of the sheet so that the alternate and remaining band portions of each row form a tube carried by said sheet and said tube having a plurality of slots with a plurality of band portions respectively located opposite said slots, a plurality of current collectors respectively extending along the interiors of said tubes; and a plurality of active masses surrounding said current collectors, respectively, and located in said tubes, respectively; and at least one edge of some of said band portions of each tube having a flap made from the material of said sheet connected to said edge and extending into the interior of the tube to support the active mass.

6. An electrode assembly for a storage battery and the like, comprising, in combination, a unitary sheet of insulating material having a plurality of rows of band portions formed from the material of said sheet with each of said band portions integral at its ends with said sheet, alternating band portions of each row extending in one direction from the plane of said sheet and the remaining band portions of said row extending in an opposite direction from the plane of said sheet so that the band portions of each row cooperate together to form an elongated tube carried by said sheet and having a plurality of slots with said band portions respectively located opposite said slots; a plurality of current collectors respectively extending along the interiors of said tubes; and a plurality of active masses surrounding said current collectors, respectively, and located in said tubes, respectively.

7. An electrode assembly for a storage battery and the like, comprising a unitary sheet of electrically non-conductive material including a plurality of rows of band portions each of which is integral at its ends with said sheet, said band portions being formed from the material of said sheet and alternate band portions of each row extending in one direction from the plane of said sheet with the remaining band portions of each row extending in an opposite direction from the plane of the sheet so that the alternate and remaining band portions of each row form a tube carried by said sheet and said tube having a plurality of slots with a plurality of band portions respectively located opposite said slots, a plurality of current collectors respectively extending along the interiors of said tubes; and a plurality of active masses surrounding said current collectors, respectively, and located in said tubes, respectively; said alternating band portions of each row being of the same size as said remaining band portions of each row.

8. An electrode assembly for a storage battery and the like, comprising a unitary sheet of electrically non-conductive material including a plurality of rows of band portions each of which is integral at its ends with said sheet, said band portions being formed from the material of said sheet and alternate band portions of each row extending in one direction from the plane of said sheet with the remaining band portions of each row extending in an opposite direction from the plane of the sheet so that the alternate and remaining band portions of each row form a tube carried by said sheet and said tube having a plurality of slots with a plurality of band portions respectively located opposite said slots, a plurality of current collectors respectively extending along the interiors of said tubes; and a plurality of active masses surrounding said current collectors, respectively, and located in said tubes, respectively; said alternating band portions of each row being of a different size than said remaining band portions of each row.

References Cited in the file of this patent

UNITED STATES PATENTS

| | | |
|---|---|---|
| 408,809 | Meserole | Aug. 13, 1889 |
| 1,377,227 | Spencer | May 10, 1921 |
| 1,450,565 | Smith | Apr. 3, 1923 |

OTHER REFERENCES

Vinval, G. W.: "Primary Batteries," John Wiley & Sons, New York, 1950, page 45 (Library Call No. QC 603, V5).